Figure 1:
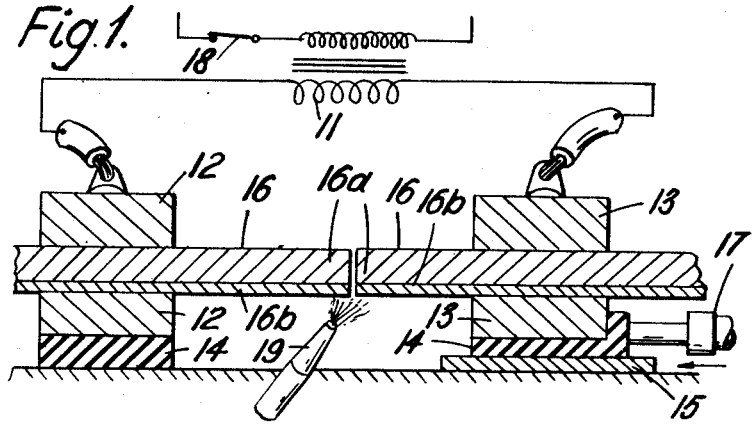

United States Patent Office 3,136,881
Patented June 9, 1964

3,136,881
JOINING BIMETAL OR MULTILAYER
METALLIC STRIP MATERIAL
John Leslie Darvell, London, England, assignor to Vandervell Products Limited, London, England, a British company
Filed Feb. 19, 1962, Ser. No. 174,111
Claims priority, application Great Britain Feb. 24, 1961
5 Claims. (Cl. 219—104)

This invention relates to joining pieces of multilayer metallic strip material by welding at their edges, and in particular to the joining by electric butt-welding of two pieces of bimetallic material, each piece consisting of a layer of non-ferrous material coated onto a backing layer of steel, wherein the non-ferrous material contains a constituent deleterious to the formation of a strong weld.

In a typical application of the invention, the steel backing layer is of mild steel while the non-ferrous layer can be one of a number of well-known bearing alloys. Since the mechanical strength of such a bimetallic material is derived principally from that of the steel layer, any joint made between the two edges of two pieces of the material should primarily be a joint between the two opposing layers of steel.

In experiments on the butt-welding of such bimetallic materials, we have found that the constituents of the non-ferrous layer can become entrained in the welded joint between the two opposing layers of steel and if such entrained constituents have a low inherent strength, or give a weak bond with the steel, a weak joint will result. In particular, it was found that the presence of lead in more than small amounts in a bearing alloy would produce a weak joint. No difficulty was experienced in welding bimetallic strips consisting of a tin-based babbitt alloy (maximum 0.25% lead content) on a mild steel backing layer but very poor results were obtained in attempts to weld bimetallic strips comprising a lead-based babbitt alloy and also in attempts to weld bimetallic strips comprising various copper-based alloys which contained more than 5% lead.

Silver, magnesium, and cadmium are other metals which do not alloy with iron, while numerous other materials could be disadvantageous due to their formation of brittle or low strength alloys with iron.

In order to achieve a weld prior to our invention it was found necessary to remove the non-ferrous layer from the steel in the region of the weld by melting, or by milling, or by a similar operation before making the weld.

According to the invention, a method of electrically butt-welding ferrous strip having a non-ferrous metal surface layer comprises arranging the strip in a position such that when the non-ferrous layer melts on application of the welding current, the non-ferrous metal is substantially removed from the locality of the weld by gravity.

Preferably, the method comprises arranging the strip in a horizontal or near horizontal plane with the non-ferrous layer underneath, and applying the welding current, whereupon the non-ferrous layer melts and is substantially removed from the locality of the weld by gravity.

Figure 2:
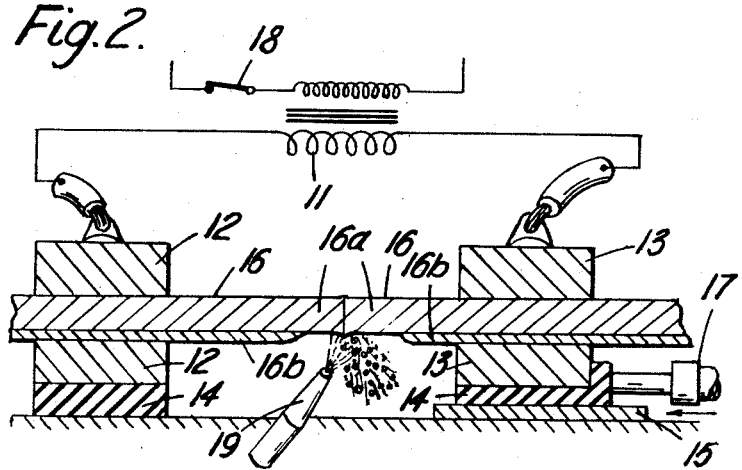
Figure 3:
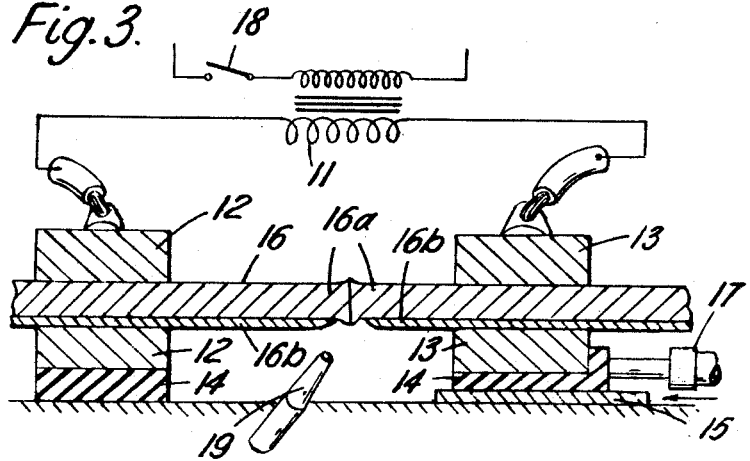

One method according to the invention of electrically butt-welding ferrous strip having a non-ferrous metal surface will now be described with reference to the accompanying drawings in which FIGURES 1–3 illustrate diagrammatically various steps in the method.

In a welding machine suitable for the application of the invention, a heavy alternating current is supplied from a transformer 11 to two horizontally opposed jaws 12, 13 constructed of heavy copper sections. The first, 12, of the jaws is fixed while the second, 13, is electrically insulated from the first 12, by insulating material 14 and is mounted on a horizontal slide 15 so that it can approach the first jaw 12. In making a weld each jaw 12, 13 holds one of the pieces of bimetallic strip 16 comprising a ferrous backing 16a and a nonferrous surface layer 16b to be joined and the sliding jaw 13 is retracted by a ram 17 to its fullest extent from the fixed jaw 12; this allows an excess length of bimetallic strip 16 to be held between the jaws 12, 13. On applying the electric current to the jaws 12, 13 by closing a switch 18 in the transformer primary circuit resistance heating occurs between the butting edges of the bimetallic strip pieces 16 and as the edges melt and disperse the sliding jaw 13 is slowly advanced by the ram 17 to maintain the edges in contact. This results in the rapid heating of the adjacent strip, and the nonferrous layer 16b is melted behind the butting edges of the bimetallic strip 16 for a distance of about half an inch; the bulk of the molten non-ferrous metal falls from the backing 16a as indicated in FIGURE 2 and at the same time any lead in the remaining small amount of nonferrous metal is volatilised from the region of the edges. With some non-ferrous alloys it has proved helpful to expedite the removal of the molten alloy from the weld area with a blast of compressed air from a nozzle 19; if required, this could be replaced by a blast of hot or cold inert gas. Once the non-ferrous alloy has been removed from the weld area, a strip device on the sliding jaw 13 cuts off the electric current by causing switch 18 to open as indicated in FIGURE 3 and the sliding jaw 13 is rapidly advanced to force the clean hot edges of the steel backing 16a into close contact to form the weld. The movement of the sliding jaw 13 can be controlled either manually or by an automatic sequence timer.

In one example bimetallic strip pieces 4.5 in. wide, with steel 0.060 in. thick, and leaded bronze 0.030 in. thick, were welded using a transformer of 50 kva. maximum output at 7.5 volts. The welding current was applied for a period of four seconds during which time the moving welding jaw was steadily advanced to maintain the strip edges in contact. An automatic cut-off actuated by the moving jaw then cut off the welding current and the jaw was rapidly advanced to complete the weld. Test pieces cut from the weld area always broke outside the weld when pulled on a tensile testing machine, showing that the weld was substantially stronger than the parent metal. Examination of the microstructure of the weld area showed traces of copper alloy in the weld but no traces of lead were found.

Similarly, good results have been obtained with several different copper based bearing alloys containing from 3% to 30% lead and from 0% to 15% tin in thicknesses from 0.010 in. to 0.125 in. on steel backing layers from 0.050 in. to 0.150 in. thick.

I claim:
1. A method of joining the edges of two pieces of strip, each said strip having a ferrous layer and a non-ferrous metal surface layer, comprising the steps of
   (a) positioning the pieces of strip with the edges thereof abutting each other,
   (b) passing welding current through the strips and across the abutting edges so that the non-ferrous layer in the region of the abutting edges melts and so that the ferrous metal in the region of the abutting edges is heated to welding temperature,
   (c) during the passage of said welding current gravitationally removing said molten non-ferrous metal from the region of the abutting edges, and
   (d) after removal of the non-ferrous metal advancing the hot clean edges of the strips towards each other, so that the abutting edges of the ferrous layer are butt-welded together.
2. A method of joining the edges of two pieces of strip, each said strip having a ferrous layer and a non-ferrous metal surface layer, comprising the steps of
   (a) positioning the pieces of strip with the edges thereof abutting each other,
   (b) passing welding current through the strips and across the abutting edges so that the non-ferrous layer in the region of the abutting edges melts and so that the ferrous metal in the region of the abutting edges is heated to welding temperature,
   (c) during the passage of said welding current supporting said strips to have a position in which gravity removes said molten non-ferrous metal from the region of the abutting edges, and
   (d) after removal of the non-ferrous metal advancing the hot clean edges of the strips towards each other, so that the abutting edges of the ferrous layer are butt-welded together.

3. A method of joining the edges of two pieces of strip, each said strip having a ferrous layer and a non-ferrous metal surface layer, comprising the steps of
   (a) positioning the pieces of strip with the edges thereof abutting each other,
   (b) passing welding current through the strips and across the abutting edges so that the non-ferrous layer in the region of the abutting edges melts and so that the ferrous metal in the region of the abutting edges is heated to welding temperature,
   (c) during the passage of said welding current supporting said strips in a position in which the ferrous layer is uppermost and substantially horizontal, in which position gravity removes said molten non-ferrous metal from the region of the abutting edges, and
   (d) after removal of the non-ferrous metal advancing the hot clean edges of the strips towards each other, so that the abutting edges of the ferrous layer are butt-welded together.

4. A method of joining the edges of two pieces of strip, each said strip having a ferrous layer and a non-ferrous metal surface layer, comprising the steps of
   (a) positioning the pieces of strip with the edges thereof abutting each other,
   (b) passing welding current through the strips and across the abutting edges so that the non-ferrous layer in the region of the abutting edges melts and so that the ferrous metal in the region of the abutting edges is heated to welding temperature,
   (c) during the passage of said welding current gravitationally removing said molten non-ferrous metal from the region of the abutting edges,
   (b) after removal of the non-ferrous metal, cutting off said welding current, and
   (e) advancing the hot clean edges of the strips towards each other, so that the abutting edges of the ferrous layer are butt-welded together.

5. A method of joining the edges of two pieces of strip, each said strip having a ferrous layer and a non-ferrous metal surface layer, comprising the steps of
   (a) positioning the pieces of strip with the edges thereof abutting each other,
   (b) passing welding current through the strips and across the abutting edges so that the non-ferrous layer in the region of the abutting edges melts and so that the ferrous metal in the region of the abutting edges is heated to welding temperature,
   (c) during the passage of said welding current gravitationally removing said molten non-ferrous metal from the region of the abutting edges,
   (d) assisting the removal of said molten non-ferrous metal by directing a blast of gas, and
   (e) after said removal of the non-ferrous metal, advancing the hot clean edges of the strips towards each other so that the abutting edges of the ferrous layers are butt-welded together.

References Cited in the file of this patent

UNITED STATES PATENTS

| | | |
|---|---|---|
| 1,190,208 | Williams | July 4, 1916 |
| 1,578,658 | Hall et al. | Mar. 30, 1926 |
| 2,003,467 | Randolph et al. | June 4, 1935 |
| 2,238,034 | Chace | Apr. 15, 1941 |
| 2,716,690 | Lund | Aug. 30, 1955 |